United States Patent
Foster et al.

(10) Patent No.: US 7,143,579 B2
(45) Date of Patent: Dec. 5, 2006

(54) VELOCITY CONTROL OF AGRICULTURAL MACHINERY

(75) Inventors: Christopher A. Foster, Akron, PA (US); Richard P. Strosser, Akron, PA (US)

(73) Assignee: CNH America LLC, New Holland, PA (US)

( * ) Notice: Subject to any disclaimer, the term of this patent is extended or adjusted under 35 U.S.C. 154(b) by 9 days.

(21) Appl. No.: 11/108,549

(22) Filed: Apr. 18, 2005

(65) Prior Publication Data

US 2006/0230754 A1   Oct. 19, 2006

(51) Int. Cl.
*F16D 31/02* (2006.01)
*F16D 39/00* (2006.01)

(52) U.S. Cl. .......................... 60/446; 60/448
(58) Field of Classification Search ................ 60/446, 60/447, 448, 487
See application file for complete search history.

(56) References Cited

U.S. PATENT DOCUMENTS

| 5,070,695 A | * | 12/1991 | Metzner | 60/448 |
| 5,542,251 A | * | 8/1996 | Leibing et al. | 60/448 |
| 5,561,979 A | * | 10/1996 | Coutant et al. | 60/448 |
| 5,592,817 A | * | 1/1997 | Nishimura et al. | 60/448 |
| 6,807,809 B1 | * | 10/2004 | Schuh | 60/448 |

* cited by examiner

*Primary Examiner*—Thomas E. Lazo
(74) *Attorney, Agent, or Firm*—Stephen A. Bucchianeri; John William Stader; Michael G. Harms

(57) ABSTRACT

The apparatus is an automatic velocity control system for an agricultural machine. Three feedback circuits are used to increase reliability and repeatability of the apparatus despite variations in load and ground conditions and non-linear responses of control components. A solenoid current sensor supplies a feedback signal to control a current controller for solenoids controlling a hydraulic valve, a hydraulic cylinder position sensor provides a feedback signal to counteract the non-linearity of the hydraulic valve controlling the hydraulic cylinder, and wheel speed sensors supply vehicle speed signals to be compared to the signal from the operator's speed control. A microprocessor processes the sensor signals to maintain the desired velocity.

2 Claims, 3 Drawing Sheets

VELOCITY CONTROL OF AGRICULTURAL MACHINERY

BACKGROUND OF THE INVENTION

This application is based upon U.S. Provisional Patent Application Ser. No. 60/569,756 filed May 10, 2004.

This invention deals generally with farm machinery and more specifically with a speed or velocity control for such machines.

In the past two decades the use of electronic control systems in vehicles has seen a surge in development and applications. Due to economies of scale, the auto industry, with its large capacity, initially lead the way in the application of electronic controls on vehicles. Systems such as cruise-control, electronic engine management, climate control, and electronic transmissions are now common in road vehicles.

The velocity control, known as cruise-control in automobiles, has been present for quite sometime. Automobile drive trains exhibit non-linear dynamic behavior, particularly at lower speeds, but at higher speeds the action becomes more linear. Even with low speed non-linearity, velocity control has been successful for automobiles because cruise control is used almost exclusively in the higher speed ranges. However, the emerging technology of automated highway-systems calls for speed control systems that work over the full range.

In the last ten years manufacturers of agricultural machinery have also been developing and releasing more electronic control systems on their equipment to help agricultural producers implement precision agriculture, and the ultimate goal is fully automated machines. Although a variety of nonlinear and adaptive systems have been developed to address the non-linear control problems, the dynamics are somewhat different for the hydraulic drive trains of farm machines. Because of the larger mass of farm machines and the rougher terrain in which they operate, the control task in this work is much more difficult. An automated farm machine has many interacting subsystems, and must have several levels of control. The control objectives include vehicle motion, trajectory control, obstacle detection, and tool manipulation. To bring this technology into the agricultural market place the costs have to be reasonable for smaller quantities than are available in the automobile market. This requires that cost effective control systems be developed and implemented.

An automated farm machine relies on a database of information within an on-board computer to aid in decision making. Machinery with at least some level of automation is often required to make the best use of information in the database. An example of this is variable distribution technology or site specific crop management that can yield reductions in the quantities of agro-chemicals and fertilizer applied and can help reduce contamination of ground water and pollution of streams from run off.

One of the problems with automatic velocity or speed control for most agricultural equipment is the non-linear action of activating mechanisms, particularly solenoid valves within the hydraulic system that constitutes the drive train. A typical farm machine within which some automatic control systems are being implemented is a windrower, which is an agricultural machine for hay and forage preparation, crop harvesting, and crop residue processing. The performance of the hydraulic drive-train can vary considerably depending on the ground and crop conditions. When working in a field with varying ground and crop conditions the operator has to make many adjustments to maintain vehicle speed and loading. It would, therefore, be desirable to implement a velocity control system to reduce the number of adjustments the operator must make. This would allow the operator to concentrate more on other systems and processes. The objective of the velocity control system is to improve operator performance, and reduce fatigue. A control system that counteracts the non-linear characteristics of hydraulic controls would therefore be very beneficial for use with agricultural machines.

SUMMARY OF THE INVENTION

The present invention is a computer based control system for a velocity control system for a farm machine with a hydraulic drive train that uses several feedback signals to overcome the inherent non-linearity of the solenoid operated hydraulic valves within the drive train control. Ideally such a system permits the operator to set a desired machine velocity and the automated system maintains that velocity regardless of ground and crop conditions.

In the preferred embodiment, the velocity control of the invention is installed on a windrower. The drive train of the windrower consists of two independent hydraulic loops, one driving each of the front wheels, and each loop is composed of two primary components, a hydraulic pump and a hydraulic motor. The power source is the windrower's diesel engine to which the hydraulic pumps are directly connected. The velocity of each wheel is approximately proportional to the flow of oil in the corresponding hydraulic loop, and that oil flow in each loop is produced by the hydraulic pump that is a variable displacement axial piston pump.

The oil flow from each pump is regulated in two ways, by the rotational speed of the pump, which is directly correlated to engine speed, and by adjusting the displacement of the pump. Pump displacement is varied by changing the angle of the swash plate of the pump, and the swash plate is adjusted through an external pintle arm. Hence, the wheel velocity is controlled by appropriately positioning the pintle arm.

The pintle arms of the hydraulic pumps are positioned through a mechanical linkage and a spring centered hydraulic cylinder driven by a proportional flow control valve which is used to displace both pintle arms simultaneously. The hydraulic cylinder position therefore approximately correlates with the average velocity of the vehicle at a constant engine RPM. The hydraulic cylinder is spring centered to a neutral position at which point the vehicle is stationary, and one direction of movement of the hydraulic cylinder moves the pintle arms to provide forward movement while the other direction of movement of the cylinder provides reverse motion. To indicate the position of the hydraulic cylinder, a cylinder position feedback signal is generated by a rotary potentiometer interconnected with the hydraulic cylinder. This is one of three feedback signals used in the preferred embodiment.

The proportional flow control valve is itself controlled by two electrically powered solenoids built into the valve, one for each direction of movement of the hydraulic cylinder. The two solenoids are controlled in the present invention by a current controller within an on-board microprocessor to which the cylinder position feedback signal is fed.

The onboard control module microprocessor is also used for the machine control system. Machines with electronically controlled engines have the engine control unit interconnected with the onboard microprocessor. The embedded controller runs on a 100 Hz loop and is used to control a variety of systems on the vehicle, including the velocity control of the present invention.

One of the other control feedback loops of the preferred embodiment is the vehicle speed control loop. In simple terms, the present invention uses an input from the machine operator's manual speed control that generates a first input signal to indicate the operator's requested speed. A second input signal is generated by and received from a speed sensor. These two signals are compared within the onboard microprocessor and a velocity error signal is generated that indicates the change, if any, needed to produce the speed set by the operator.

The velocity error signal is fed to a velocity control algorithm within the microprocessor that adjusts the signal fed to the current controller to generate the appropriate current needed to adjust the current to the control valve solenoids to achieve the set velocity. This velocity control algorithm counteracts the non-linearity of the control valve solenoid current relative to vehicle speed.

The valve and cylinder system is also non-linear as it approaches the region of changeover between extension and retraction of the cylinder. The cylinder position controller counteracts this based on feedback from the hydraulic cylinder.

The control feedback loop adjusts the current through the valve solenoids to overcome any non-linearity. Feedback signals from the currents in the hydraulic valve solenoids are fed to the current controller within the microprocessor which adjusts the actual current being fed to the appropriate solenoid within the hydraulic valve in order to properly displace the hydraulic cylinder and the pintle arms. Thus, any inherent error is minimized.

The present invention thereby provides a reliable velocity control for farm machines.

DETAILED DESCRIPTION OF THE INVENTION

Figure 1:
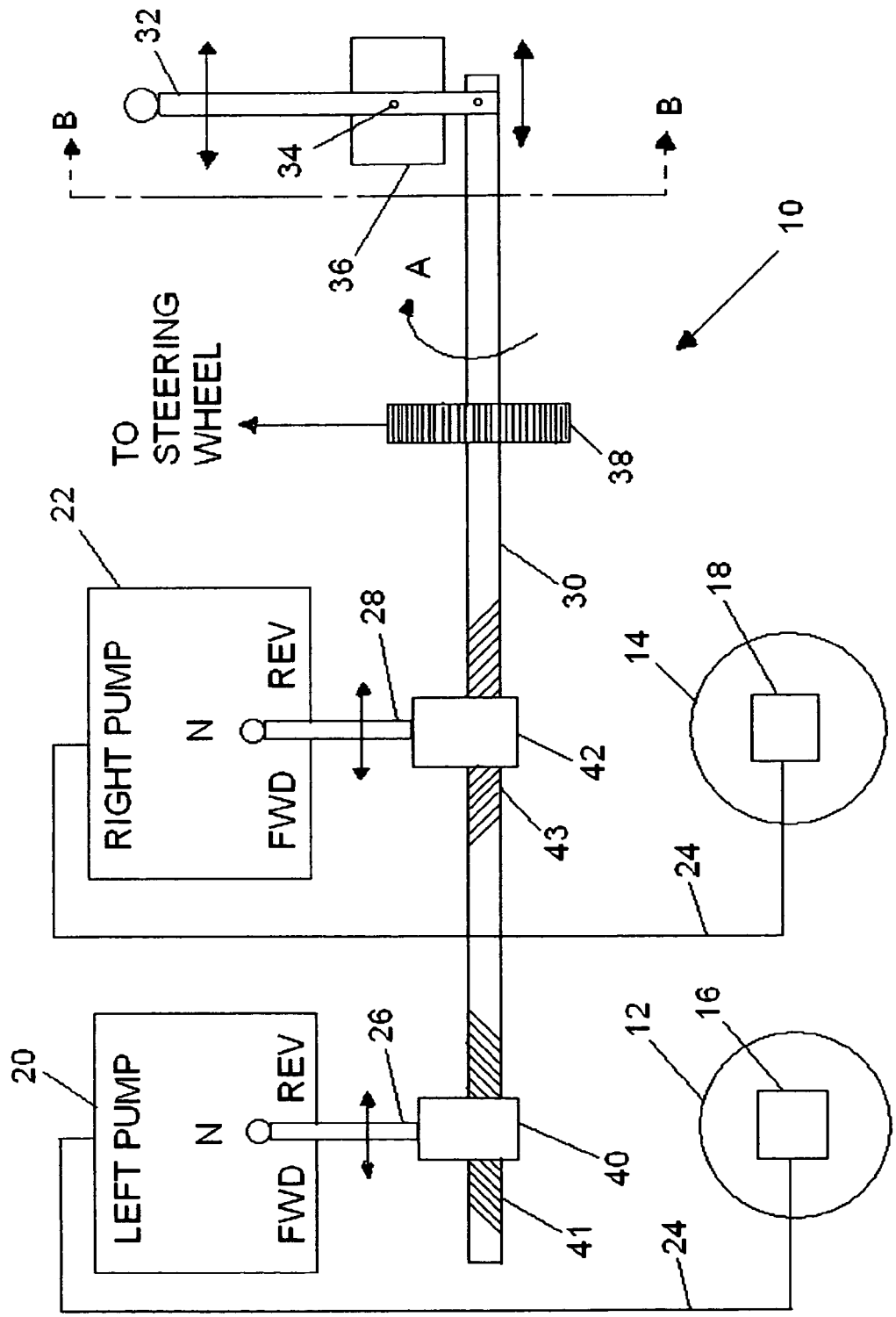
FIG. 1 is a simplified block diagram of the prior art manual steering and speed control apparatus of a typical self propelled farm machine.

FIG. 1 is a simplified block diagram of manual steering and speed control apparatus 10 of a typical self propelled prior art farm machine. Motive power is delivered to left wheel 12 and right wheel 14 by hydraulic wheel motors 16 and 18, respectively. Hydraulic wheel motors 16 and 18 are themselves powered from left hydraulic pump 20 and right hydraulic pump 22, which are mechanically powered from the machine's engine (not shown) by conventional mechanical linkages (not shown).

Left pump 20 and right pump 22 supply hydraulic fluid under pressure to wheel motors 16 and 18 through hydraulic lines 24. Each of pumps 20 and 22 has the capability of rotating its associated wheel motor so that the powered wheel will go forward or in reverse, and if the pump is in its neutral setting, to not power the wheel at all. The three settings of pumps 20 and 22 are indicted in FIG. 1 as "FWD", "REV", and "N". Moreover, pumps 20 and 22 are not simple on and off devices, but their fluid outputs vary with the position of pintle arms 26 and 28. Thus, the farther each pintle arm 26 and 28 is moved away from the neutral position, the greater is the flow delivered to the associated hydraulic motor and the greater is the speed of the associated wheel.

Pintle arms 26 and 28 are both attached to speed control rod 30, and speed control rod 30 is displaced axially by control handle lever 32 that the machine operator moves. Control handle lever 32 is a simple lever that pivots on pin 34 attached to a point on machine chassis 36 and to a pivoting link on speed control rod 30. With that simple mechanical linkage, as the operator moves control handle lever 32, pintle arms 26 and 28 change the status of pumps 20 and 22 and vary the power delivered to wheels 12 and 14. When, as shown in FIG. 1, pintle arms 26 and 28 are parallel, pumps 20 and 22 respond equally to movement of control handle lever 32 and wheels 12 and 14 move in the same direction and at the same speed so that the machine moves straight ahead.

However, typically the steering system of the machine is also controlled by pumps 20 and 22. To change the direction of such a farm machine, the speeds of drive wheels 12 and 14 are made to be different from each other, with one wheel turning slower than the other. This is accomplished by making left pump 20 and right pump 22 deliver different quantities of hydraulic fluid to their respective wheel motors, which can be accomplished by rotating a conventional steering wheel (not shown).

The rotation of such a steering wheel is mechanically transmitted to rotational drive 38 attached to and capable of rotating speed control rod 30. Rotational drive 38 can typically be a gear linked to the steering wheel. As previously described, axial motion of speed control rod 30 moves pintle arms 26 and 28 that control the power that pumps 20 and 22 deliver to their respective wheel motors, and as long as pintle arms 26 and 28 are oriented in parallel, the power delivered to the wheels is equal. However, pintle arms 26 and 28 are attached to speed control rod 30 by threaded collars 40 and 42 that engage thread sets 41 and 43 respectively, and thread sets 41 and 43 have oppositely directed threads. Thus, the rotation of speed control rod 30 changes the effect of the axial position of speed control rod 30 on pumps 20 and 22, and thus changes the speed of wheels 12 and 14.

For example, assuming a farm machine has its manual steering and speed control apparatus 10 set as shown in FIG. 1, that is, both pintle arms have their pumps set in Neutral position. Then, rotating speed control rod 30 in the direction indicated by arrow "A" would cause pintle arm 26 to move toward the "Forward" setting of left pump 20 and pintle arm 28 to move toward the "Reverse" setting of right pump 22. If engine power were then applied to both pumps, left wheel 12 would rotate for forward movement and right wheel 14 would rotate for reverse movement. This action would actually cause the machine to rotate to the right around the central point of the axle between the right and left wheels. This same effect will occur when both pumps are set for forward motion, except that rotating speed control rod 30 will then cause one wheel to rotate faster and the other to slow down. This will then cause the machine to turn.

Figure 2:
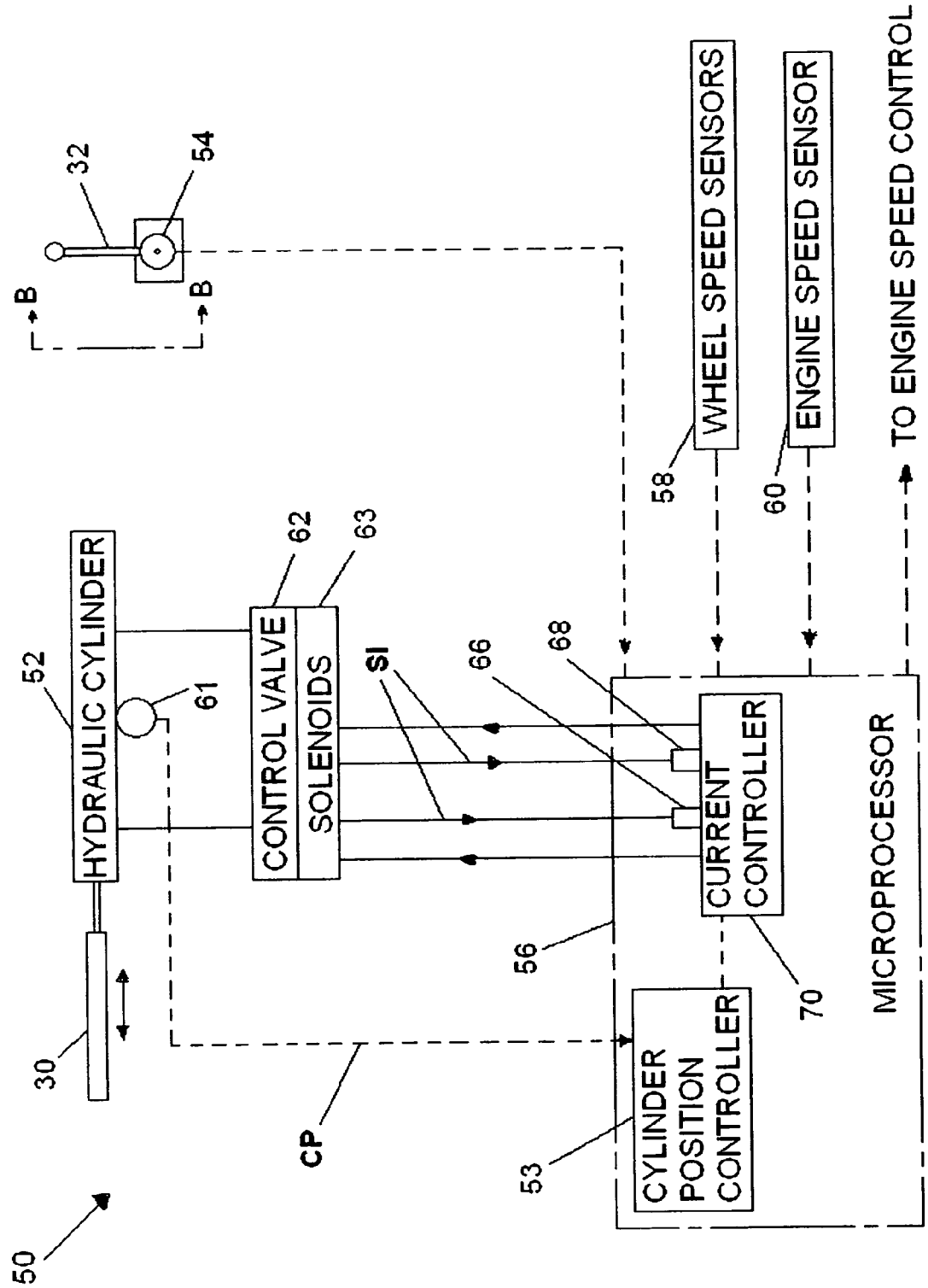
FIG. 2 is a simplified block diagram of the hydraulic cylinder position control apparatus of the preferred embodiment of the invention within a broader overall automatic control system.

Signal paths discussed in the following text are indicated in both FIG. 2 and FIG. 3 as dashed lines. FIG. 2 is a simplified block diagram of hydraulic cylinder position control apparatus 50 of the preferred embodiment of the invention which is used in conjunction with the prior art steering and speed control apparatus shown in FIG. 1. To operate automatic position control apparatus 50 with the prior art apparatus of FIG. 1, automatic position control apparatus 50 is inserted between speed control rod 30 and control handle lever 32 to the left of the separation point indicated by the divider line B—B in FIG. 1.

As shown in FIG. 2, speed control rod 30 is moved axially by hydraulic cylinder 52, and control handle lever 32 is interconnected with control handle position sensor 54. Control handle position sensor 54 indicates to microprocessor 56 the position at which control handle lever 32 has been set. Control handle position sensor 54 is only one of several sensors from which microprocessor 56 derives information. The other sensors specifically associated with position control apparatus 50 are hydraulic cylinder position sensor 61, and control valve solenoid current sensors 66 and 68. Current sensors 66 and 68 indicate the current in the two solenoids within typical electrically operated proportional control valve 62. One of the solenoids 63 and one of the sensors 66 or 68 are used for each direction of motion of control valve 62.

Hydraulic cylinder position control apparatus 50 adjusts the current through solenoids 63 of control valve 62 to overcome any non-linearity in the response of the solenoids. In solenoid current feedback loop SI, the currents in hydraulic valve solenoids 63 are fed through current sensors 66 and 68 within microprocessor 56 and the microprocessor adjusts current controller 70 accordingly. Current controller 70 then adjusts the actual current being fed to the appropriate solenoid 63 within control valve 62 in order to properly displace hydraulic cylinder 52 and the pintle arms (FIG. 1).

Cylinder position control feedback loop CP takes the control to a higher degree of refinement. Hydraulic cylinder position sensor 61 reads the physical position of hydraulic cylinder 52, and feeds the information to microprocessor 56. The microprocessor then adjusts hydraulic cylinder 52 through cylinder position controller 53 to adjust the hydraulic cylinder position to accommodate to any non-linearity in the path between hydraulic cylinder 52 and cylinder position controller 53.

Other sensors interconnected with and supplying signals to microprocessor 56 are wheel speed sensors 58 (one for each driven wheel) and engine speed sensor 60. All of these sensors are conventional devices. For instance, in the preferred embodiment of the invention control handle position sensor 54 is a rotary position sensor, such as a rotary potentiometer, and hydraulic cylinder position sensor 61 is also a rotary position sensor. Wheel speed sensors 58 are reluctance sensors on each wheel, and engine speed sensor 60 for four cylinder engines is an alternator signal and for six cylinder engines is a magnetic sensor. Each of these devices supplies an appropriate electronic signal to microprocessor 56, which then interprets the conditions of the machine and takes action according to its internal program.

When the machine operator sets control handle lever 32 to any particular position for a specific machine speed, control handle position sensor 54 provides a signal to microprocessor 56, and microprocessor 56 provides appropriate signals to current controller 70 to operate control valve 62. Based on the signals received from microprocessor 56, control valve 62 feeds hydraulic pressure to the extend port or the retract port of hydraulic cylinder 52, and speed control rod 30, which is attached to hydraulic cylinder 52, is moved accordingly. FIG. 2 depicts a typical hook up in which, when pressure from control valve 62 moves hydraulic cylinder 52 and speed control rod 30 toward the right, based on the previous description of FIG. 1, the wheel speed of the machine is reduced or reversed. Similarly when control valve 62 causes hydraulic cylinder 52 and speed control rod 30 to move to the left there is an increase in forward wheel speed or a reduction in reverse wheel speed.

Figure 3:
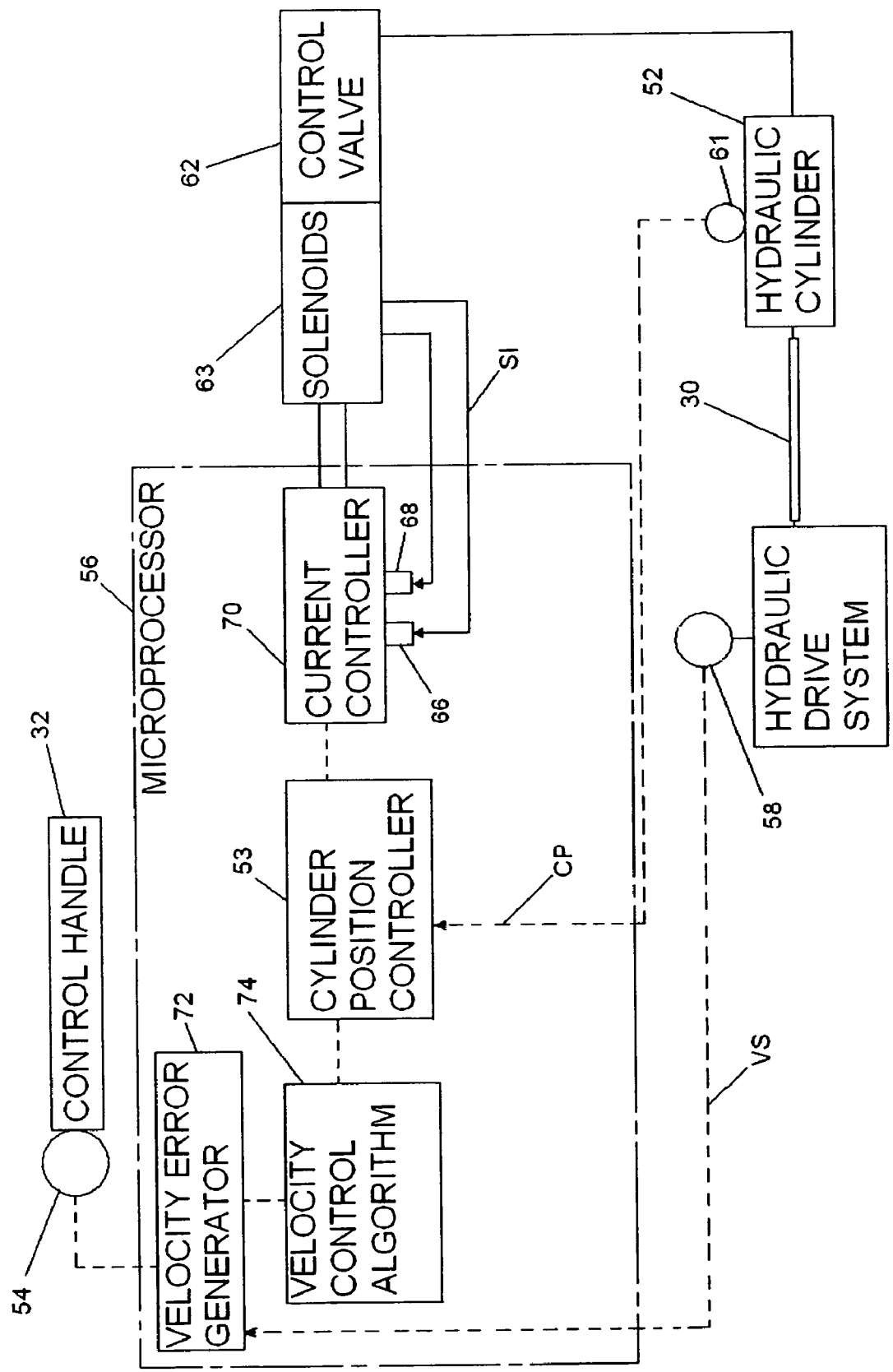
FIG. 3 is a simplified block diagram of the multiple feedback apparatus of the preferred embodiment of the invention that incorporates the hydraulic cylinder position control apparatus shown in FIG. 2.

FIG. 3 is a simplified block diagram of the multiple control feedback loop apparatus of the preferred embodiment of the invention that incorporates hydraulic cylinder position control apparatus 50 shown in FIG. 2. Pintle arms 26 and 28 (FIG. 1) of the hydraulic pumps are positioned through a mechanical linkage, and spring centered hydraulic cylinder 52 is used to displace speed control rod 30 and pintle arms 26 and 28 simultaneously. Hydraulic cylinder 52 is driven by proportional flow control valve 62. The position of speed control rod 30 therefore approximately correlates with the average velocity of the vehicle at a constant engine RPM, but greater accuracy is attained by the three control feedback loops shown in FIG. 3.

The control feedback loop for vehicle speed control is labeled VS, and signal generated by wheel speed sensors 58 is interconnected with the wheels and used in vehicle speed control feedback loop VS of the preferred embodiment which controls the vehicle velocity.

The velocity control apparatus uses an input from sensor 54 at control handle lever 32 to indicate the operator's requested velocity and the feedback signal from sensor 58 indicates the actual wheel speed. These two signals are compared by velocity error generator 72 within onboard microprocessor 56 and a velocity error signal is generated. This velocity error signal indicates the change, if any, needed to produce the speed set by the operator.

The velocity error signal is fed to velocity control algorithm 74 within microprocessor 56 to adjust the signals fed to cylinder position controller 53 and current controller 70 to generate the appropriate current needed to achieve the set velocity. The output of microprocessor 56 adjusts the current being fed to the appropriate solenoid 63 within control valve 62.

Hydraulic cylinder 52 is spring centered to a neutral position at which point the vehicle is stationary, and one direction of movement of hydraulic cylinder 52 moves the pintle arms to provide forward movement while the other direction of movement of hydraulic cylinder 52 provides reverse motion.

Control valve 62 is itself controlled by two electrically powered solenoids 63 built into the valve, one for each direction of movement of the hydraulic cylinder. The current for each solenoid is controlled by current controller 70, which is itself controlled by on-board microprocessor 56. Microprocessor 56 also controls the choice between the two solenoids 63.

Cylinder position feedback control loop CP is, however, desirable because of the non-linear response of the motion of hydraulic cylinder 52 to the current input to valve 62, particularly in the changeover region between extension and retraction motions where there is a dead zone. To counteract this non-linearity, sensor 61 is used to indicate the position of hydraulic cylinder 52 so that microprocessor 56 can adjust the currents of solenoids 63 in valve 62 to the profile of the motion of speed control rod 30 in the non-linear region of control valve 62.

The non-linearity of control valve 62 is also counteracted within microprocessor 56 by generating a history of the error signals received from control handle sensor 54 compared to the actual wheel speed read by wheel speed sensors 58. This is stored in the microprocessor memory and is used to adjust the current feeding solenoids 63 of valve 62 to attain the set velocity despite the non-linearity. Solenoid current feedback loop SI controls the current within solenoids 63. The action of current controller 70 is adjusted based upon feedback signals received from current sensors 66 and 68 so that any inherent error is minimized.

By providing feedback signals from several of the potential sources of error, the present invention furnishes a highly accurate and repeatable velocity control for agricultural machines despite the unique problems caused by changing load, ground conditions, and engine RPM.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example the invention can be used on machines other than the windrower of the preferred embodiment, and any type of sensor can be used in place of those discussed in regard to the preferred embodiment. Furthermore, multiple valves can be substituted for control valve 62, and control valve 62 can be operated by a single solenoid 63 rather than two.

What is claimed as new and for which Letters Patent of the United States are desired to be secured is:

The invention claimed is:

1. In a machine in which hydraulic components control the machine velocity by moving a speed control that controls the outputs of hydraulic pumps that drive hydraulic wheel motors; the action of the hydraulic components is controlled by at least one hydraulic valve that is operated by at least one solenoid, with the hydraulic valve varying the oil flow to the hydraulic components; and an operator's control handle furnishes commands for the at least on hydraulic valve through a microprocessor; the improvement comprising:

a velocity control apparatus comprising:

a velocity control feedback loop providing velocity status information to the microprocessor to maintain the velocity of the machine at a velocity selected by an operator of the machine, wherein in the velocity control feedback loop receives a first signal from a first sensor indicating the velocity selected by the operator, receives a second signal from a second sensor indicating the wheel speed, and the microprocessor processes the first and second to derive a velocity error signal that is used to adjust the speed control and the velocity of the machine;and a hydraulic component position feedback loop which receives a third signal from a third sensor indicating a position of a hydraulic component, and the third feedback signal is supplied to the microprocessor which adjusts the position of the hydraulic component to the position required to maintain the velocity of the machine.

2. The velocity control apparatus of claim 1 further including a solenoid current feedback loop which receives a fourth signal from a fourth sensor indicating the current in the at least on solenoid of the at least one hydraulic valve and the fourth feedback signal is supplied to the microprocessor which adjusts the current in the at least one solenoid valve to that required to maintain the velocity of the machine.

* * * * *